(12) United States Patent
Rowells

(10) Patent No.: US 7,788,923 B2
(45) Date of Patent: Sep. 7, 2010

(54) CONSTANT EGR RATE ENGINE AND METHOD

(75) Inventor: Robert L. Rowells, Elmwood Park, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 694 days.

(21) Appl. No.: 11/345,961

(22) Filed: Feb. 2, 2006

(65) Prior Publication Data

US 2007/0175215 A1 Aug. 2, 2007

(51) Int. Cl.
*F02B 33/44* (2006.01)
*F02B 37/00* (2006.01)
*F02B 37/12* (2006.01)
*F02M 25/07* (2006.01)

(52) U.S. Cl. .......... 60/612; 60/605.2; 123/562

(58) Field of Classification Search .......... 60/612, 60/611, 605.1, 600–603, 605.2, 285; 123/562, 123/564; F02B 33/44, 37/00, 37/12; F02M 25/07
See application file for complete search history.

(56) References Cited

U.S. PATENT DOCUMENTS

| | | | |
|---|---|---|---|
| 5,142,866 A * | 9/1992 | Yanagihara et al. | 60/612 |
| 5,201,790 A * | 4/1993 | Mukai et al. | 60/612 |
| 6,062,026 A * | 5/2000 | Woollenweber et al. | 60/612 |
| 6,151,890 A * | 11/2000 | Hoshi | 60/285 |
| 6,237,335 B1 * | 5/2001 | Lonnqvist | 60/605.2 |
| 6,273,076 B1 * | 8/2001 | Beck et al. | 60/612 |
| 6,321,537 B1 * | 11/2001 | Coleman et al. | 60/612 |
| 6,345,602 B1 * | 2/2002 | Maddock et al. | 60/602 |
| 6,378,308 B1 * | 4/2002 | Pfluger | 60/612 |
| 6,484,500 B1 * | 11/2002 | Coleman et al. | 60/612 |
| 6,494,179 B1 * | 12/2002 | Pantring et al. | 123/295 |
| 6,543,230 B1 * | 4/2003 | Schmid | 60/605.2 |
| 7,165,403 B2 * | 1/2007 | Sun et al. | 60/612 |
| 7,171,292 B2 * | 1/2007 | Bellinger et al. | 701/111 |
| 2006/0174621 A1 * | 8/2006 | Chen et al. | 60/612 |

FOREIGN PATENT DOCUMENTS

| | | | |
|---|---|---|---|
| DE | 4139291 A1 * | 6/1993 | |
| FR | 2859760 A1 * | 3/2005 | |
| JP | 07293262 A * | 11/1995 | |
| JP | 07332072 A * | 12/1995 | |
| JP | 2004092499 A * | 3/2004 | |

* cited by examiner

*Primary Examiner*—Thai Ba Trieu
(74) *Attorney, Agent, or Firm*—Jack D. Nimz; Jeffrey P. Calfa

(57) ABSTRACT

An internal combustion engine (100) includes a first exhaust manifold (120), and a second exhaust manifold (118) fluidly connected to the first exhaust manifold (120) through an exhaust valve (122). An exhaust gas recirculation (EGR) cooler (124) constantly fluidly connects the second exhaust manifold (118) with an intake manifold (112). A turbocharger (102) has a turbine (126) in fluid communication with the first exhaust manifold (120), and a compressor (132) in fluid communication with a supercharger (140). A charge air cooler (150) fluidly connects the supercharger (140) with the intake manifold (112).

1 Claim, 2 Drawing Sheets

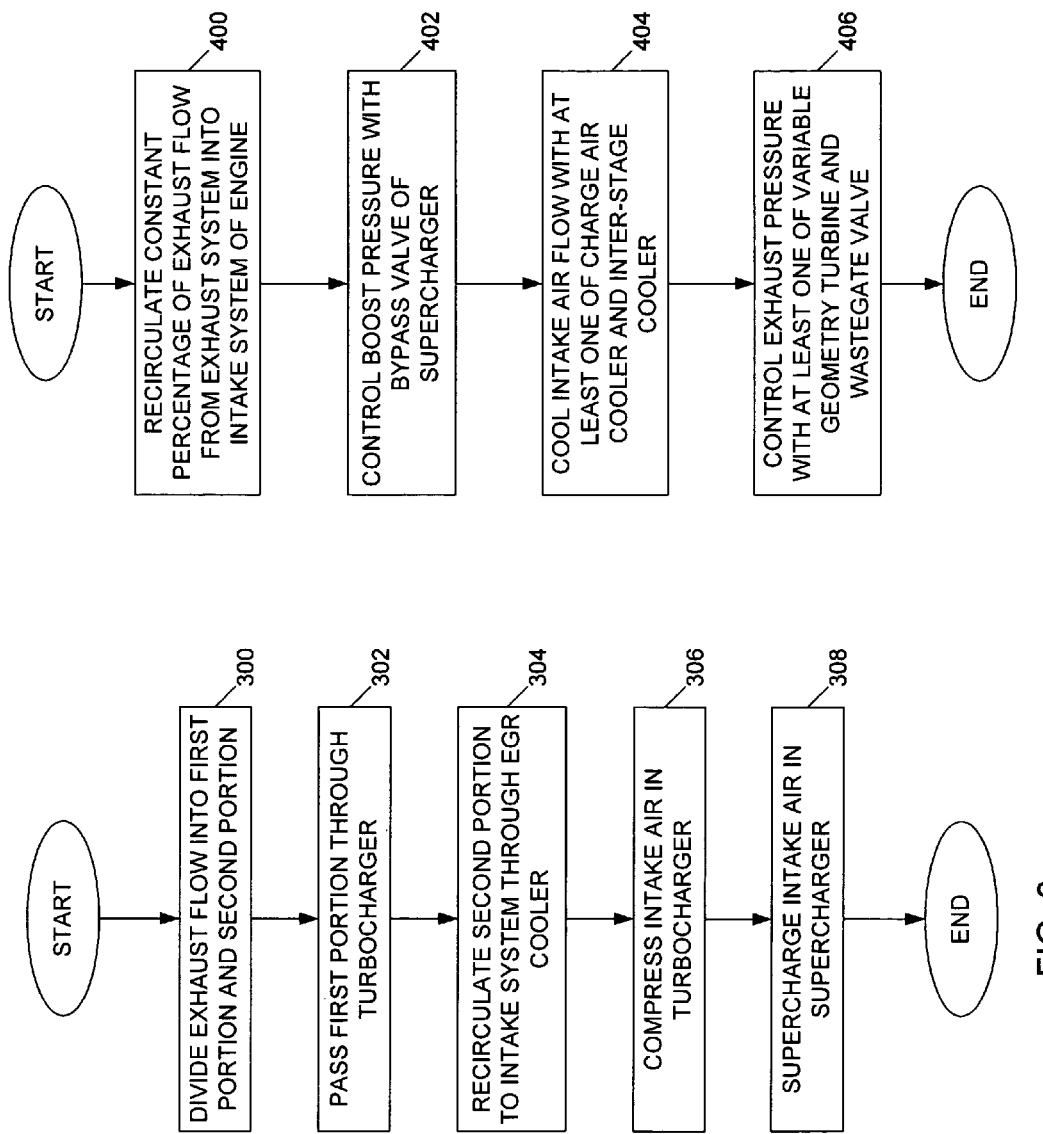

CONSTANT EGR RATE ENGINE AND METHOD

FIELD OF THE INVENTION

This invention relates to internal combustion engines, including but not limited to engines having turbochargers and exhaust gas recirculation (EGR) systems.

BACKGROUND OF THE INVENTION

Exhaust gas recirculation (EGR) for internal combustion engines is known. Typical compression ignition engines may also cool recirculated exhaust gas in EGR coolers. In an engine that is not naturally aspirated, for example, an engine having a turbocharger, a difference in pressure between the exhaust system and intake system of the engine may determine a maximum amount of exhaust gas that may be recirculated from the exhaust into the intake of the engine.

Exhaust gas in the exhaust system upstream of the turbocharger is at an exhaust pressure, or exhaust back pressure (EBP) during operation of the engine. Conversely, air or a mixture of air and exhaust gas in the intake manifold of the engine is at an intake manifold pressure, or a manifold absolute pressure (MAP) during operation of the engine. An EGR valve is usually employed to fluidly connect the exhaust and intake manifolds. When the EGR valve is opened, exhaust gas flows from the exhaust system into the intake system of the engine. Primary factors that determine a capacity of the EGR system on an engine to flow exhaust gas are the size of the EGR valve opening, and a difference of pressure between EBP and MAP, typically referred to as Delta P.

Some engines may require more EGR gas than what the engine is able to provide during operation, partly because many engines are advantageously designed to run under low Delta P conditions because such conditions are conducive to high fuel economy. Nevertheless, even under conditions of low Delta P, demands for EGR gas flow increase as emissions requirements for the engine decrease.

There have been many methods to augment EGR gas flow on an engine having low Delta P during operation. One method is to use an intake throttle valve configured to constrict air flow into the intake manifold of an engine, placed at a location upstream of a point of mixing of exhaust gas and air in the intake system. By closing the intake throttle valve, the MAP is lowered and Delta P will increase. One disadvantage of this method is that pumping loss in the engine increases thus lowering fuel economy and the power output of the engine.

Accordingly, there is a need for augmentation of EGR gas flow in an engine having a turbocharger that does not depend solely on use of an intake throttle valve or other methods.

SUMMARY OF THE INVENTION

An internal combustion engine includes a first exhaust manifold, and a second exhaust manifold fluidly connected to the first exhaust manifold through an exhaust valve. An exhaust gas recirculation (EGR) cooler fluidly connects the second exhaust manifold with an intake manifold. A turbocharger has a turbine in fluid communication with the first exhaust manifold, and a compressor in fluid communication with a supercharger. A charge air cooler fluidly connects the supercharger with the intake manifold.

A method for the internal combustion engine includes the step of dividing an exhaust flow of the engine into a first portion and a second portion. The first portion passes through a turbocharger. The second portion is recirculated to an intake system through an exhaust gas recirculation cooler. Intake air is compressed in a compressor and supercharged in a supercharger.

Another method for an internal combustion engine includes the step of recirculating a substantially constant percentage of exhaust flow from an exhaust system of the engine into an intake system of the engine. A boost pressure of the engine may be controlled with a supercharger having a bypass valve. An intake air flow may be cooled using at least one of an inter-stage cooler disposed between the supercharger and a turbo-compressor, and a charge air cooler disposed between the supercharger and the intake system. An exhaust pressure of the engine may be controlled using at least one of a variable geometry turbine and a turbine wastegate valve.

BRIEF DESCRIPTION OF THE DRAWINGS

FIG. 3 is a flowchart for a method of operating an internal combustion engine under substantially constant rates of EGR in accordance with the invention.

FIG. 4 is a flowchart for another method of operating an internal combustion engine under substantially constant rates of EGR in accordance with the invention.

DESCRIPTION OF A PREFERRED EMBODIMENT

The following describes an apparatus for and method of operating an internal combustion engine under substantially constant rates of EGR. An EGR rate may be defined as a percentage of fluid input to the engine by mass. Air, or a mixture of air and recirculated exhaust gas, may be ingested by an engine during operation. The portion, or percentage, of recirculated exhaust gas in the mixture represents what is referred to in the art as an EGR rate. The embodiments of this invention that are disclosed below pertain to operation of an engine under a constant rate of EGR over almost an entire range of engine operation. The constant EGR rate that advantageously may be employed is not entirely determined by an opening of an EGR valve; rather, it is determined by a hardware configuration of the engine.

Figure 1:
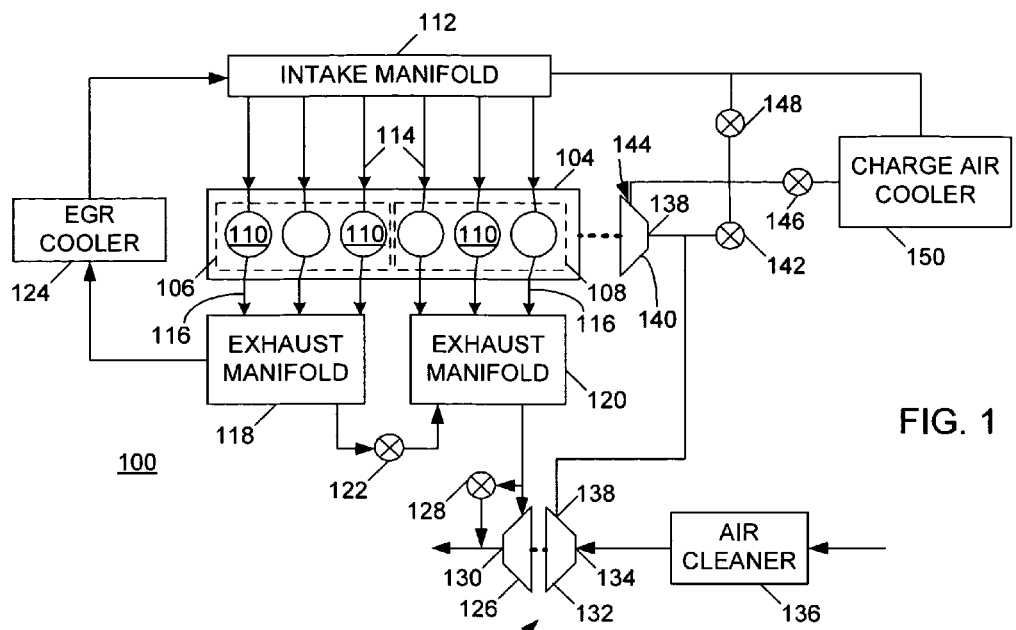
FIG. 1 is a block diagram of an engine having a constant rate EGR system in accordance with the invention.

An engine 100 having a turbocharger 102 is shown in FIG. 1. The engine 100 includes a crankcase 104 having a first plurality of cylinders 106 and a second plurality of cylinders 108. The crankcase 104 as shown is configured for a linear arrangement of each cylinder 110 within each of the first and second pluralities of cylinders, but other configurations may be used. For example, an engine having a V-configuration may include two sets of cylinder banks arranged on opposite sides of the engine. In such a case, each bank of cylinders may make up each plurality of cylinders as described above.

An intake manifold 112 is connected to each of the cylinders in the first and second pluralities 106 and 108, and is arranged to provide them with a mixture of air and exhaust gas for combustion. An intake runner 114, corresponding to each cylinder 110, carries the mixture of air and exhaust gas to the cylinder 110 where it is mixed with fuel and combusts in accordance with, for example, a four stroke engine cycle, or any other known engine cycle. An exhaust runner 116 corresponding to each cylinder 110 carries exhaust gas away from the cylinder 110 after combustion occurs.

Each exhaust runner 116 corresponding to the first plurality of cylinders 106 is connected to a first exhaust manifold 118. Similarly, each exhaust runner 116 corresponding to the second plurality of cylinders 108 is connected to a second exhaust manifold 120. An exhaust balance valve 122 connects the first exhaust manifold 118 with the second exhaust manifold 120. The first exhaust manifold 118 is connected to the intake manifold 112 through an exhaust gas recirculation (EGR) cooler 124. The second exhaust manifold 120 is connected to a turbine 126 that is part of the turbocharger 102. The turbine 126 may have a waste-gate valve 128 connecting the second exhaust manifold 120 with an outlet 130 of the turbine 126.

The turbocharger 102 also includes a compressor 132. The compressor 132 has an inlet 134 that may be connected to an air cleaner box 136. An outlet 138 of the compressor 132 is in direct fluid communication with an inlet 138 of a supercharger 140, and with a first intake air valve 142. The supercharger 140 may be operably connected to the engine 100 to receive power therefrom through a geared connection or a belt connection, an electrical connection, or any other method which is not exhaust gas driven, as is known in the art of internal combustion engines. An outlet 144 of the supercharger 140 is connected to the first intake air valve 142, a charge air cooler cutoff valve 146, and an intake air bypass valve 148. A charge air cooler 150 is connected between the charge air cooler cutoff valve 146 and the intake manifold 112.

Figure 2:
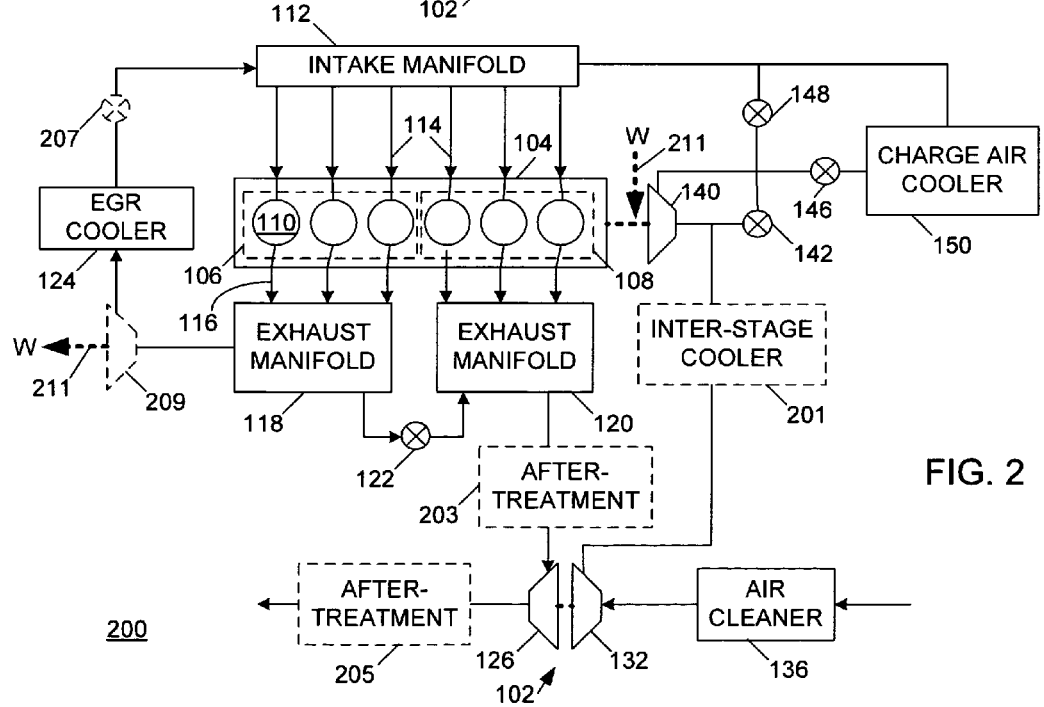
FIG. 2 is a block diagram of an alternate embodiment of an engine having a constant rate EGR system in accordance with the invention.

An alternate embodiment of an engine 200 is shown in FIG. 2. The engine 200 includes many components common with the engine 100 described above that are denoted with the same reference numerals for the sake of brevity. Nevertheless, the engine 200 includes additional optional components that may advantageously improve operation of the engine 200.

One optional component is an inter-stage cooler 201 connected downstream of the compressor 132 and before the supercharger 140 and the first intake air valve 142. The inter-stage cooler 201 may be used to cool air exiting the compressor 132 during operation of the engine 200, and may be advantageous to the operation of the supercharger 140 by increasing its efficiency.

Another optional component may be after-treatment devices, for instance diesel particulate filters, oxidation catalysts, and so forth, that may be connected around the turbine 126. For example, an after-treatment module 203 may be connected between the second exhaust manifold 120 and the turbine 126. The after-treatment module 203 may advantageously take advantage of high exhaust gas temperatures and pressures to treat exhaust gas exiting the second exhaust manifold 120. Alternatively, a second after-treatment module 205 may be connected downstream of the turbine 126. Each of the after-treatment modules 203 and 205 may be used in combination or separately.

One other optional component may be an EGR cutoff valve 207, connected between the first exhaust manifold 118 and the intake manifold 112. The valve 207 presented in FIG. 2 is connected downstream of the EGR cooler 124, but may alternatively be connected upstream of the EGR cooler 124. The cutoff valve 207 may advantageously be an ON/OFF type valve for exhaust gas, and may be used under conditions of cold ambient engine start (for example, cold engine starting at ambient temperatures of −30 degrees Celsius or below).

Another optional component is a low pressure turbine 209. The turbine 209 may be connected between the EGR cooler 124 and the first exhaust manifold 118. The turbine 209 may advantageously produce a work output 211, denoted by a dashed line and the letter "W." The work output 211 may advantageously be used to drive a compressor for the intake air (not shown), or even be used in conjunction with or instead of engine power to drive the supercharger 140. Use of the turbine 209 is advantageous because a temperature of exhaust gas entering the EGR cooler 124 from the first exhaust manifold 118 may be lowered, and the additional work output 211 may be used for the supercharger 140 instead of being removed from the engine 200.

A flowchart for a method of operating an internal combustion engine under substantially constant rates of EGR is shown in FIG. 3. Exhaust gas from an internal combustion engine is divided into first and second portions in step 300. The first portion of the exhaust flow is passed through a turbocharger in step 302. The second portion of the exhaust flow is passed to an intake system of the engine, advantageously through an EGR cooler, in step 304. Intake air is compressed by the turbocharger at step 306. The intake air is further compressed by a supercharger before entering the intake system at step 308. When the engine is operating in a light mode, for example under conditions of low engine speed and load, an exhaust balance valve may be opened to mix the first portion with the second portion of exhaust gas, thus increasing an efficiency of the turbocharger. The exhaust balance valve may advantageously be opened when the engine is cold to reduce the time required for engine warm-up.

A flowchart for another method of operating an internal combustion engine under substantially constant rates of EGR is shown in FIG. 4. A constant percentage of exhaust flow is recirculated from an exhaust system into an intake system of an internal combustion engine at step 400. The constant percentage may be about 50%, as defined by a mass flow rate of exhaust gas recirculated back into the intake of the engine as percentage of the total mass flow of gas and air entering the intake of the engine. A pressure in the intake manifold (boost) of the engine may be controlled with a bypass valve of a supercharger at step 402. An engine electronic engine controller (ECU) may be arranged to monitor various engine operating parameters, and may send position commands to a supercharger, or intake air, bypass valve. Intake air may be cooled in a charge air cooler or an inter-stage cooler before entering the intake manifold of the engine at step 404. A pressure in a first and/or second exhaust manifolds may be controlled by a waste-gate or a variable geometry turbocharger at step 406.

Depending on an operation mode of the engine, when the engine is operating, air may advantageously be bypassed around the supercharger under conditions of low engine speed and load (for instance, engine speed below 1500 RPM and less than about 30% load). Also, intake air flow may be bypassed around the charge air cooler if ambient conditions are conducive to such an action, for example, if ambient conditions are below 10 degrees Celsius. When the engine is cold, for example when engine lubricating oil or coolant are within 10 degrees Celsius of ambient temperature, the first portion of exhaust gas may advantageously be mixed with the second portion of exhaust gas by opening the exhaust valve disposed between the first and second exhaust manifolds to help the engine warm up faster and to prevent potential misfire due to high EGR rates. The exhaust valve may be closed when the engine has reached a normal operating temperature.

In one embodiment, the supercharger may be bypassed at light loads, during reductions in load, and at mid to high load steady state loads where the turbocharger can produce a required engine air flow. Low engine speeds combined with increases in demanded engine load may be the main operating contribution of the supercharger, although any operating condition where the turbocharger is incapable of providing an intake manifold pressure needed may advantageously be augmented by the operation of the supercharger. When intake manifold pressure is adequate for the operation of the engine, the supercharger will probably be bypassed to some appropriate degree.

Additional advantages may be realized for an engine having variable valve timing capability, or by simply changing the valve timing, or cam events, between the first plurality and the second plurality of cylinders. Early exhaust valve opening aids turbocharger response, and increases exhaust gas temperature, which is beneficial to the operation of after-treatment components. Later exhaust valve opening improves thermal efficiency, and lowers exhaust gas temperature, which is beneficial for exhaust gas recirculation.

An additional advantage is the implementation of an asymmetric fuel injection strategy. The operation of the engine, and the operation of after-treatment components, may have different requirements for constituents of the exhaust gas (NOX, HC, soot). Because only one portion of the exhaust gas exiting the engine is supplied to the after-treatment components during normal operation of the engine, air to fuel ratios for the cylinders supplying the turbocharger may be biased to improve operation of the after-treatment components, while cylinders supplying EGR gas may be optimized for engine operation.

An additional advantage to the operation of an engine in accordance with the invention is the ability to increase clutch engagement torque of the engine to the transmission of a vehicle because of the additional engine torque output capability the supercharger is able to provide at idle. In practice, this may simply offset the reduction in clutch engagement torque incurred by very high EGR rates of the engine.

An additional advantage to the operation of an engine in accordance with the invention is the ability of the supercharger to control an air-to-fuel ratio (AFR) of the engine during transients. Typically, engines employing EGR are arranged to discontinue recirculation of exhaust gas during a period of engine acceleration because too much exhaust gas during the transient lowers the AFR, thereby producing smoke spikes, and too little exhaust gas at the beginning of a transient may increase AFR, thereby producing a nitrous oxide emission spike. The supercharger in the embodiments presented herein may advantageously be used for instantaneous AFR control during the engine's operation during transients by fine control of the first intake air valve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
dividing an exhaust flow of an engine into a first portion and a second portion;
passing the first portion through a turbocharger;
recirculating the second portion to an intake system through an exhaust gas recirculation cooler;
compressing intake air in a compressor; and
supercharging intake air in a supercharger,
further comprising the step of mixing the first portion and the second portion when the engine is cold.

\* \* \* \* \*